UNITED STATES PATENT OFFICE.

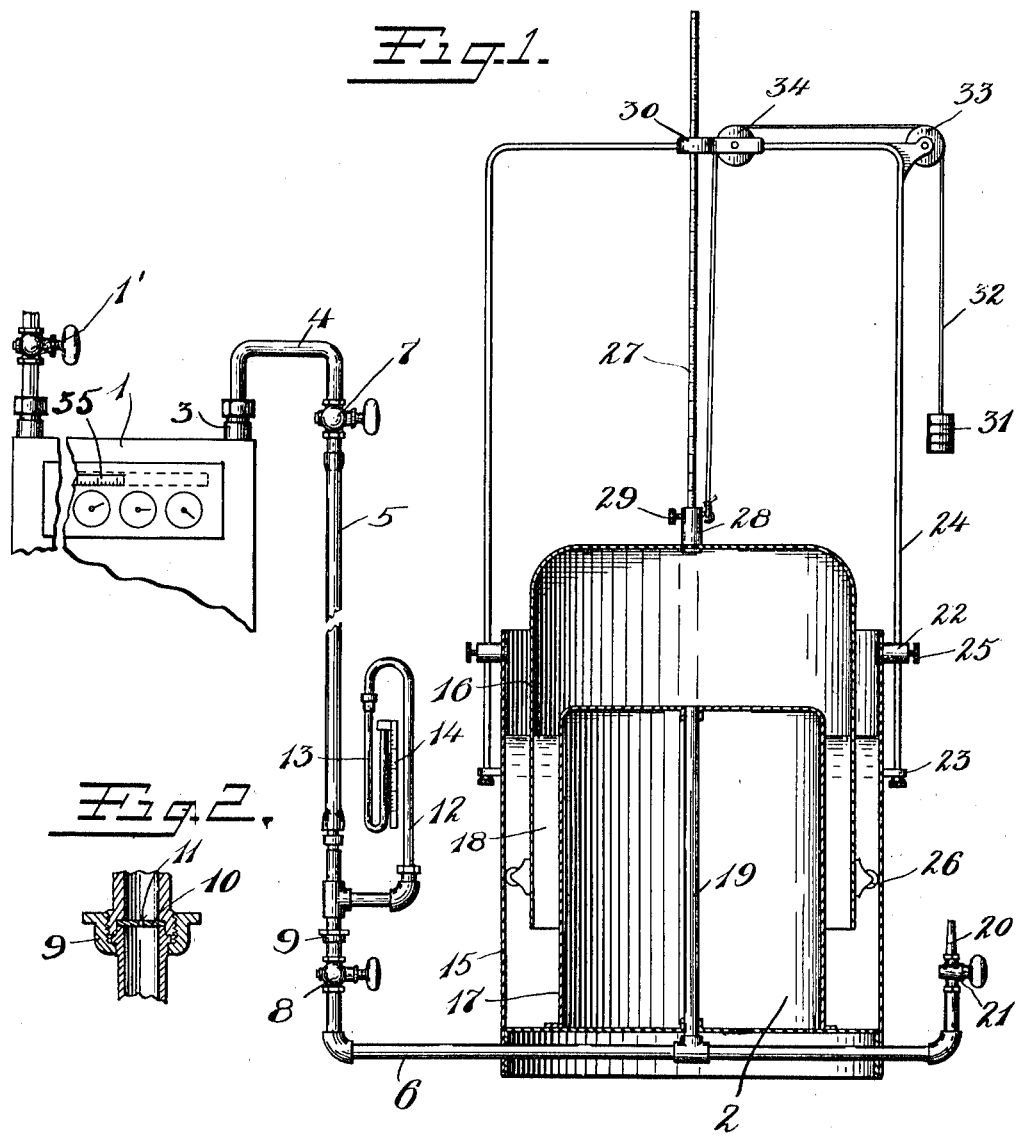

RICHARD L. DEZENDORF, OF RICHMOND HILL, NEW YORK.

METER-TESTING APPARATUS.

1,061,271.   Specification of Letters Patent.   Patented May 13, 1913.

Application filed September 15, 1911. Serial No. 649,443.

*To all whom it may concern:*

Be it known that I, RICHARD L. DEZENDORF, a citizen of the United States, residing at Richmond Hill, county of Queens, State of New York, have invented certain new and useful Improvements in Meter-Testing Apparatus, of which the following is a full, clear, and exact description.

My invention relates to meter testing apparatus, and has for its object to provide apparatus for testing meters on the premises of customers without disconnecting the same from the supply mains.

The following is a description of an embodiment of my invention, reference being had to the accompanying drawings, in which—

Figure 1 shows diagrammatically an embodiment of my invention. Fig. 2 is a sectional view of a detail.

Referring more particularly to the drawings, 1 is a meter to be tested.

1′ is the stop cock in the inlet connection leading from the supply main.

2 is a portable gasometer or gas holder of any suitable type connected to the outlet port 3 of the meter by a coupling 4, a flexible tube 5 and connection 6. The coupling 4 has a cock 7 for adjusting the flow of gas from the meter. The connection 6 has a cock 8 for controlling the flow of gas. It also has a universal coupling 9 between the abutting ends of which is a removable calibration disk 10 having a perforation 11. This disk may be exchanged for one having a perforation of different size, so that the flow of gas can be varied according to the conditions of flow under which it is desired to test the meter. Between the universal coupling 9 and the cock 7 is connected a pressure gage or indicator 12 of any suitable type, the form shown being the ordinary pressure indicator having a U-shaped glass tube 15 open at its disconnected end, and a graduated scale 14. The tube 13 is partially filled with water, and variations of pressure can be noted by observing the position of the column of water with reference to the scale 14.

The holder 2, shown in the drawings for the purpose of illustration is of the wet type and consists of a vessel 15 having an inverted bell 16 therein, and, preferably, a hollow center 17, so that the quantity of water 18 required for the necessary submergence of the bell 16 may be comparatively small, thus lessening the weight of the apparatus to be carried from point to point. The connection 6 has an extension 19 which passes upward through the center 17 and opens into the chamber formed by the bell 16. To the connection 6 is connected an outlet port 20 controlled by a cock 21 for the purpose of venting the chamber within the bell 16. The outlet port 20 is preferably a gas burner so that the gas may be ignited and burned as it is discharged from the holder 2. The receptacle 15 has on its opposite sides two guides 22—23, through which pass the legs of a vertically movable bail 24. This bail can be secured in elevated position by set screws 25 and can be lowered so as to occupy less space so as to render the apparatus more convenient for transportation. It also serves as a handle. The bell 16 is guided by guiding rollers 26 bearing against the inside of the receptacle 15 in the ordinary manner. To the top of the bell a scale 27 is connected by a socket 28 and set screw 29. This scale passes through an opening in the ball 24, as shown at 30, and is provided with graduations so that the position and movement of the bell 16 can be determined. In some instances it is desirable to counter-balance the bell 16, and for this purpose I provide a counterweight 31 suspended by a cord 32 connected to the bell and passing over pulleys 33 and 34.

The meter is provided with a very delicate positive indicator 35, preferably that shown in my Patent No. 924,437 granted on the 8th day of June, 1909. This indicator being of large diameter and connected directly to the tangent instead of through gearing has no lost motion, and therefore permits of very close indication and reading.

The method of testing meters by means of my invention is as follows: The supply of gas is first cut off from the meter by the stop cock 1′ on the inlet connection. The outlet connection with the meter is then disconnected from the house system. The coupling 4 is then applied to the outlet connection 3, and the meter stop cock is then opened to permit the gas to go through the meter. The lower stop cock 8 is closed and the upper stop cock 7 is opened. Gas under pressure then flows to the gage 13. The stop cock 1′ is then closed and the gage observed to determine whether or not the connections between 1' and 8 are tight. If the water in the gage remains stationary, this indicates that those connections are tight. The stop cocks 1' and 8 are then fully opened and the stop cock 7 is adjusted so as to make the pressure as indicated at the gage 13 the desired pressure for the test, the pressure indicated by the gage 13 depending upon the size of the opening 11 in the disk 10, and the adjustment of the cock 7. Some gas is allowed to enter the bell, after which the stop cock 8, which now becomes the operating cock, is closed, and the discharge port 20 is opened so as to permit the gas and air, if any, within the bell 16 to escape, and also to set the bell at the desired starting point. When the bell 16 has descended to the desired starting point, as indicated by the scale 27, the vent 20 is closed and the position of the revolution indicator 35 of the meter observed. The cock 8 is then opened permitting gas to flow through the meter and into the bell 16. The indicator 35 is then observed and when it has made one complete revolution, the stop cock 8 is immediately closed. A reading of the scale 27 is then taken, whereby the distance which the bell 16 has moved can be determined. If this movement of the bell 16 corresponds to what it should be for one complete revolution of the indicator 35, the meter tested has registered accurately. If the bell is too high, the meter has failed to register the full amount of gas which has passed through it, and if the bell 16 is too low, the meter has over-registered. Different disks 10 with perforations 11 may be substituted corresponding to the conditions of flow under which it is desired to test the meter. Ordinarily the perforations 11 should be of such size as to restrict the flow to a small fraction of the capacity of the meter, since under such conditions the error in registration of meters is more apparent. The same meter may be tested again by observing the indicator 35 and the opening and closing of the cock 8 as before, the bell 16 having been preferably previously vented through the burner 20 before said second test. After the test the house connection is again coupled on and the condition of the meter reported. If the condition of the meter is unsatisfactory it is subsequently removed for repair.

With my apparatus, meters installed in position can be properly tested by using only enough gas to produce one revolution of the tangent, which varies according to the makes and sizes of meters. By testing meters in position, the company is enabled to keep track of its various meters without the trouble and expense of removing them from the premises, and the meter is also tested under the precise conditions under which it is used. The gas which is discharged from the bell 16 is burned at the burner 20 thereby making it possible to make the test without odor of gas. Various scales 27 can be substituted in the socket 28 according to the amount of gas known to be necessary in testing various meters. The cock 8 is the operating cock and also enables the tester to shut off the gasometer so that the house system can be connected before the gasometer is vented. By closing it, the calibration disk 10 can also be changed when the gasometer is filled with gas.

As will be evident to those skilled in the art, my invention, while simple and effective, permits of various modifications without departing from the spirit thereof or the scope of the appended claims.

What I claim is:

1. The combination of a meter having an indicator, a portable gasometer, a coupling connecting said gasometer with the outlet port of said meter, a pressure gage connected between said gasometer and said meter, a cock between said gage and said meter, and means for venting said gasometer.

2. The combination of a meter having an indicator, a portable gasometer, a coupling connecting said gasometer with the outlet port of said meter, a pressure gage connected between said gasometer and said meter, a stop cock between said pressure gage and said meter, means for venting said gasometer, and means for calibrating the passage between said pressure indicator and said gasometer.

3. The combination of a meter having an indicator, a portable gasometer, a coupling connecting said gasometer with the outlet port of said meter, a pressure gage connected between said gasometer and said meter, a stop cock between said gage and said meter, means for venting said gasometer, means for calibrating the passage between said pressure gage and said gasometer, and a scale for said gasometer.

4. The combination of a meter having an indicator, a portable gasometer, a coupling connecting said gasometer with the outlet port of said meter, a pressure gage connected between said gasometer and said meter, a stop cock between said gage and said meter, means for venting said gasometer, an adjustable bail carried by the stationary part of said gasometer, and a scale for said gasometer, adjacent to said bail.

5. The combination of a meter having an indicator, a portable gasometer, a coupling connecting said gasometer with the outlet port of said meter, a pressure gage connected between said gasometer and said meter, the passage between said gage and said gasometer being calibrated so as to have a smaller capacity than said meter, a stop cock between said gage and said meter, means for venting said gasometer, and an additional stop cock between said meter and said gasometer.

6. The combination of a meter having an indicator, a portable gasometer, a coupling connecting said gasometer with the outlet port of said meter, a pressure gage connected between said gasometer and said meter, a stop cock between said gage and said meter, means for venting said gasometer, calibration means between said gage and said gasometer, and an additional stop cock between said gage and said gasometer.

7. The combination of a source of gas supply, a meter having an indicator, an inlet port connected to said source and an outlet port, a gasometer, a coupling connecting said gasometer with the outlet port of said meter, a pressure gage connected between said gasometer and said meter, a cock between said pressure gage and said gasometer, an additional cock between said meter and said source, a third cock between said pressure gage and said meter, and means for venting said gasometer.

8. The combination of a source of gas supply, a meter having an indicator, an inlet port connected to said source and an outlet port, a gasometer, a coupling connecting said gasometer with the outlet port of said meter, a pressure gage connected between said gasometer and said meter, the passage between said gage and said gasometer being calibrated to have a smaller capacity than said meter, a cock between said pressure gage and said gasometer, an additional cock between said meter and said source, a third cock between said pressure gage and said meter, and means for venting said gasometer.

RICHARD L. DEZENDORF.

Witnesses:
H. B. BROWNELL,
E. E. MORSE.